United States Patent [19]
Tharp

[11] 4,340,308
[45] Jul. 20, 1982

[54] METHOD AND APPARATUS FOR PRODUCING FLUIDIZED LIME

[76] Inventor: Billy J. Tharp, 514 E. 8th St., Trenton, Mo. 64683

[21] Appl. No.: 174,351

[22] Filed: Aug. 1, 1980

[51] Int. Cl.³ .............................................. B01F 5/10
[52] U.S. Cl. .......................................... 366/2; 366/28; 366/137; 366/184; 137/893; 137/563
[58] Field of Search ..................... 366/2, 3, 6, 10, 14, 366/150, 136, 159, 137, 162, 163, 173, 184, 348, 131, 134, 28; 137/268, 563, 893

[56] References Cited

U.S. PATENT DOCUMENTS

| | | | |
|---|---|---|---|
| 2,582,802 | 1/1952 | Terrell, Jr. | 137/563 |
| 2,895,548 | 7/1959 | Stafford | 137/563 |
| 3,254,045 | 5/1966 | Sinclair | 366/348 X |
| 3,491,949 | 1/1970 | Hairston | 366/134 X |

Primary Examiner—Philip R. Coe
Assistant Examiner—Joseph M. Pitko
Attorney, Agent, or Firm—Kokjer, Kircher, Bradley, Wharton, Bowman & Johnson

[57] ABSTRACT

A method and apparatus for producing fluidized lime is disclosed herein. The apparatus includes a storage tank for holding and storing a fluid medium. Lime particulate is mixed by an inductor unit with the fluid medium in a closed conduit to thereby eliminate the problem of air pollution. The apparatus also includes a suitable valve and conduit system for delivering the fluid medium to the inductor unit, for returning the mixture of lime particulate and fluid medium from the inductor unit to the storage tank, and for circulating the fluid medium and mixture in a manner to achieve thorough mixing.

6 Claims, 3 Drawing Figures

METHOD AND APPARATUS FOR PRODUCING FLUIDIZED LIME

BACKGROUND AND BRIEF DESCRIPTION OF THE INVENTION

This invention relates in general to the production of a fluid lime suspension and, in particular, to an apparatus for producing such a suspension.

The advantages of periodically applying fine limestone to farm land are well known. In particular, the periodic application of limestone to farm land raises the PH (makes it less acidic) of the soil and provides to the soil essential secondary nutrients such as calcium and magnesium. By properly controlling the PH level of the soil in this manner, it is possible to greatly enhance the effectiveness of any fertilizer which is applied to the soil, thereby making the land more productive.

It has been determined that the best results are obtained when the lime is applied to the soil in the form of a finely ground powder. Coarse or granular limestone is insoluble and requires many years to react and adjust the PH of the soil. By applying the limestone to the soil in the form of a fine powder, the limestone dissolves in a shorter period of time and provides more accurate control of the PH of the soil.

The application of limestone to the soil in the form of a finely ground powder, however, presents several problems. One of the major difficulties is to prevent undue generation of dust and the associated air pollution problems. Another difficulty is that it is difficult to insure uniform application of the powdered lime to the soil.

The above mentioned problems can be effectively eliminated through the use of fluidized lime. Fluidized lime is comprised of a liquid slurry wherein a lime particulate is suspended within a fluid medium. The fluid medium is normally comprised of a suspending agent such as attapulgite clay and water or liquid nitrogen.

Fluidized lime is typically produced by mixing powdered lime with the fluid medium in an open tank which is equipped with a mixing blade and circulating pump. In performing this technique, the fluid medium is initially added to the tank. Thereafter, the powdered lime is simply poured into the tank and dispersed through the fluid medium by the movement of the mixing blade.

This technique for producing fluidized lime, however, has not proved to be totally satisfactory. In particular, performance of the above mentioned technique causes a large amount of dust to be generated when the powdered lime is poured into the mixing tank. This dust creates an air pollution problem which is highly undesirable from an environmental standpoint. In addition, the above mentioned technique does not always provide uniform mixing of the lime powder within the fluid medium.

It is therefore an object of the present invention to provide a method and apparatus for producing fluidized lime wherein powdered lime is mixed with the fluid medium in a closed system, to thereby eliminate the problem of air pollution.

Another object of the invention is to provide a method and apparatus of the character described in which the fluid medium and the powdered lime are thoroughly and uniformly mixed.

An additional object of the invention is to provide an apparatus of the character described which is capable of receiving powdered lime from a pneumatic trailer to facilitate handling thereof.

It is an additional object of the present invention to provide an apparatus of the character described which is capable of producing fluidized lime quickly and easily.

Other and further objects of this invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals are employed to indicate like parts in the various views.

Figure 1:
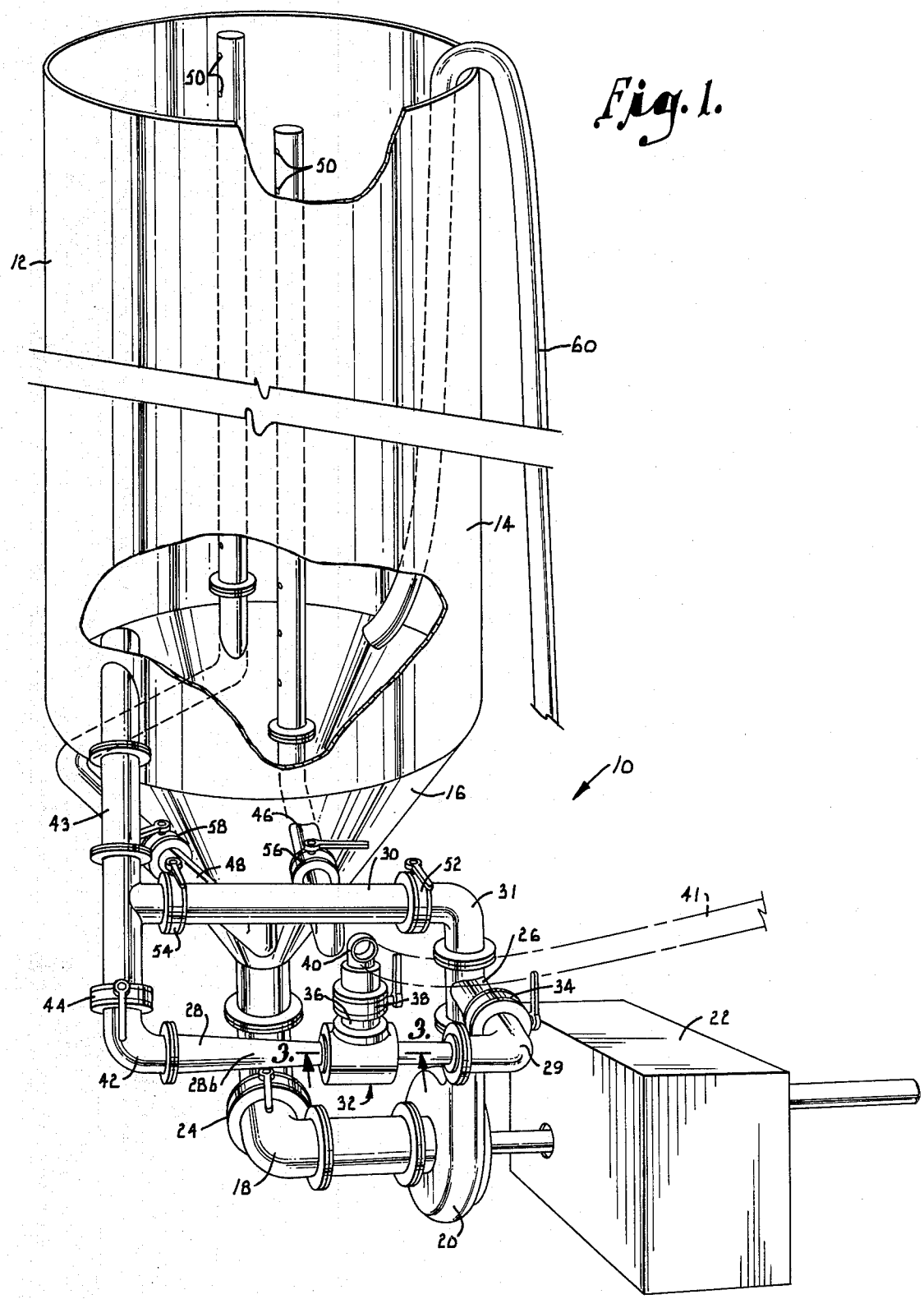
FIG. 1 is a perspective view of a fluidizing apparatus constructed according to a preferred embodiment of the present invention, with portions of the storage tank broken away for illustrative purposes.
Figure 2:
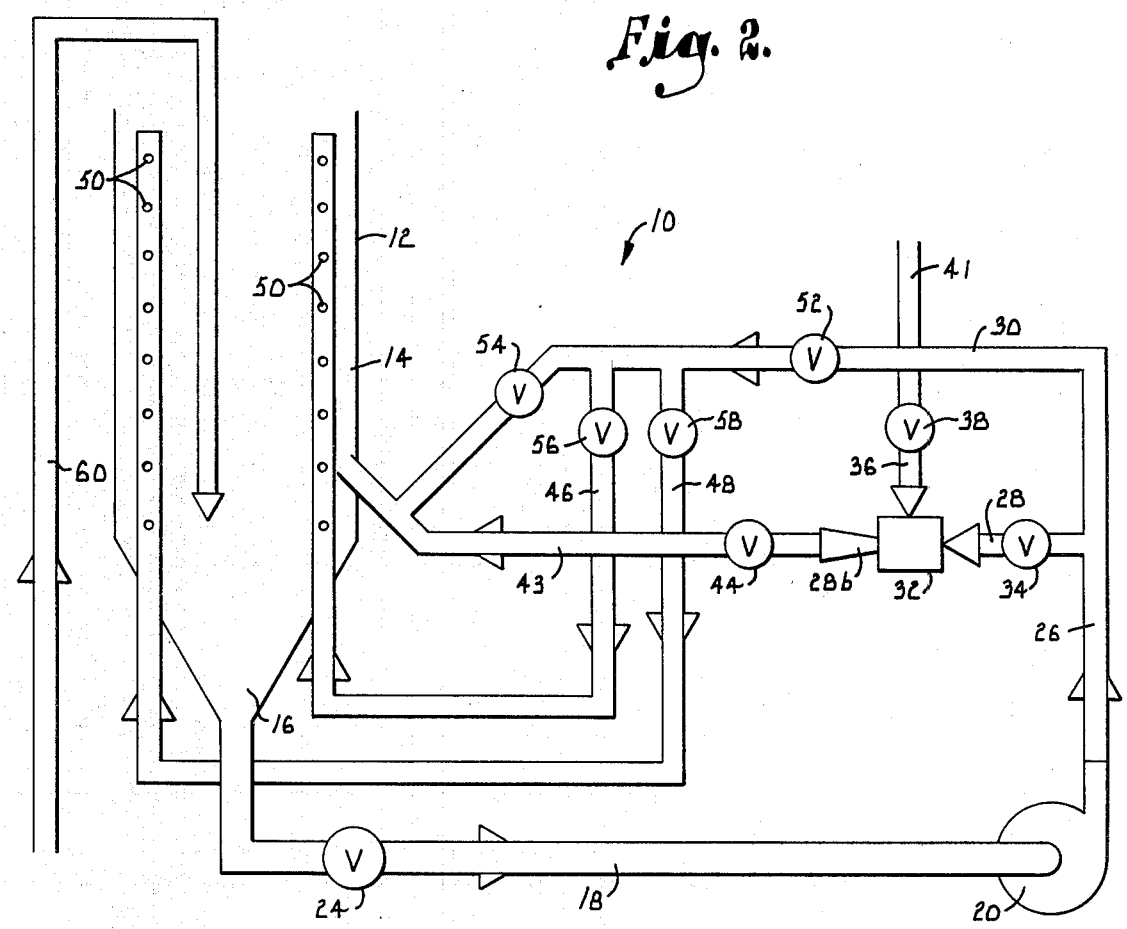
FIG. 2 is a schematic diagram of the fluidizing apparatus shown in FIG. 1.

Referring initially to FIGS. 1 and 2, numeral 10 generally designates an apparatus for producing fluidized lime which is made in accordance with a preferred embodiment of the present invention. The fluidizing apparatus 10 includes a storage tank 12 for holding the fluid medium with which the lime is mixed and storing the end product prior to application thereof. The type, size and physical configuration of the tank are not critical; however, it is preferable to use a tank with a hollow interior having a cylindrically shaped body portion 14 and a cone shaped bottom portion 16.

An output line 18 is attached to the bottom portion of the tank such that the hollow interior of the line communicates with the hollow interior of the tank. Output line 18 extends from the bottom portion of the tank to the intake or suction side of a fluid pump 20 which is driven by a motor 22. A manual valve 24 is located in the output line 18 between tank 12 and pump 20. This valve is of a standard design which is well known to those of ordinary skill in the art.

The output side of pump 20 connects with a "T" fitting 26 which in turn connects with two separate conduits 28 and 30 through respective elbows 29 and 31. Conduit 28 is equipped with an inductor unit that is generally designated by the numeral 32. A manual valve 34 is mounted between fitting 26 and elbow 29.

Figure 3:
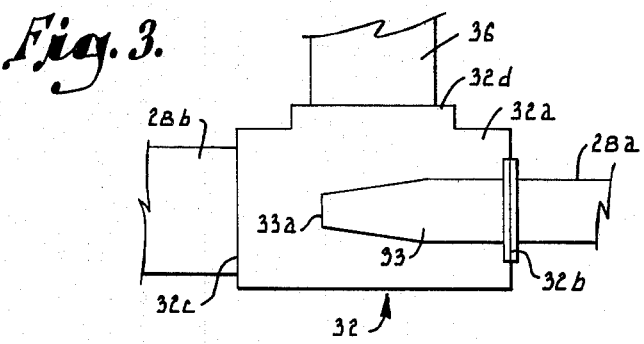
FIG. 3 is a fragmentary sectional view on an enlarged scale taken generally along line 3—3 of FIG. 1 in the direction of the arrows.

Inductor unit 32 is of a conventional construction and is best illustrated in FIG. 3. Unit 32 has a hollow casing 32a having an inlet port 32b and an outlet port 32c. Leading to connection with port 32b is a reduced size conduit 28a forming part of conduit 28. A nozzle 33 is mounted within casing 32a and receives incoming fluid entering port 32b. Nozzle 33 has an outlet 33a which is considerably reduced in diameter and which is located within casing 32a a short distance from outlet port 32c. Connected with outlet port 32c is a flared conduit 28b which forms part of conduit 28. Conduit 28b gradually diverges as its extends away from its connection with port 32c. The top of casing 32a is provided with a port 32d which serves as a lime intake port. Nozzle end 33a is in close proximity to port 32d to induce lime into the inductor unit, as will be explained in more detail.

A tubular conduit 36 is coupled with the lime intake port 32d of the inductor unit such that the hollow inner portion of the conduit communicates with the lime intake port. Conduit 36 is equipped with a valve 38 which in turn connects with a coupling 40 which serves to connect a flexible hose 41 with the inductor unit. Hose 41 leads to a tank truck or the like (not shown).

The outlet port 32c of inductor input 32 is coupled with the interior of storage tank 12 by means of conduit 28b, an elbow 42, and a return line 43 which connects through a valve 44 with elbow 42. Return line 43 passes through the outer wall of storage tank 12 and simply terminates in an open end located within the interior area of the tank. This end of line 43 is left open so that the fluid medium which is being conveyed by the return line is capable of passing through the open end of the return line back to the storage tank.

Conduit 30 connects with return line 43 at a location downstream of valve 44. A pair of mixing lines 46 and 48 branch outward from conduit 30 at spaced apart locations. Mixing lines 46 and 48 enter storage tank 12 at diametrically opposite points thereon and extend upward along the inner side walls of the tank. Each line terminates in a closed end and is provided with a plurality of vertically spaced discharge openings indicated at 50. These openings allow fluid to be sprayed into the inner area of the tank when the fluid medium is being conveyed through the mixing lines. A first manual valve 52 is located upstream of the point where mixing lines 46 and 48 branch outward from conduit 30. A second manual valve 54 is located downstream of this point. In addition, mixing line 46 is equipped with a manual valve 56, while another manual valve 58 is included in mixing line 48.

The fluidizing apparatus can also be equipped with an auxilliary mixing line 60. Auxilliary mixing line 60 is comprised of a tubular conduit which enters storage tank 12 through the open top of the tank to provide an alternative means for introducing powdered lime into the fluid medium if inductor unit 32 becomes clogged during use.

In use, a prescribed amount of fluid medium is initially placed within storage tank 12. The amount and composition of the fluid medium is critical to the effectiveness of the finished product and is determined by the character of the soil on which the finished product is to be used. The fluid medium which is initially placed in storage tank 12 is typically comprised of a wetting agent, a suspending agent such as attapulgite clay, and water. Water may be replaced with a nitrogen solution and water soluble potash may be added to the medium to enhance the effectiveness of the finished product.

The fluid medium is then thoroughly mixed. To mix the fluid medium, pump 20 is started with valves 24, 52, 56 and 58 in an open condition while valves 34, 38, 44 and 54 are in a closed condition. This configuration causes the fluid medium to be drawn out of the storage tank via output line 18 and to be pumped back into the tank through tee fitting 26, elbow 31, conduit 30 and mixing lines 46 and 48. The fluid medium returns to the storage tank through openings 50 in mixing lines 46 and 48, thereby causing the fluid medium stored within a tank to be vigorously agitated by the fluid medium being returned to the tank. The vertically spaced discharge openings 50 enchance the mixing action imparted to the fluid.

Once the fluid medium is fully mixed, pump 20 is shut off. Thereafter, valves 52, 54, 56 and 58 are closed while valves 34 and 44 are opened. The hose 41 from a pneumatic tank truck containing powdered lime is then coupled with coupling 40 of intake line 36. Pump 20 is then started causing the fluid medium to be drawn out of the storage tank 12 via output line 18 and to be pumped through inductor unit 32 before being returned to storage tank 12 via return line 43. The fluid medium flowing through inductor unit 32 passes through nozzle 33 and the reduced outlet end 33a to create a vacuum within the casing 32a of the inductor unit. This vacuum or low pressure produces a suction on intake line 36 and port 32d. Valve 38 is then opened and the pressure within the pneumatic tank truck is applied to hose 41, thereby causing the powdered lime which is stored within the pneumatic tank to be drawn into the inductor unit from the tank of the truck due to the suction effect created within the inductor unit and the pressure created by the pneumatic tank truck. In this way, the powdered lime is drawn into the inductor unit 32 and is mixed with the fluid medium under pressure. This procedure continues until all of the lime in the pneumatic tank truck has been mixed.

By mixing the powdered lime with the fluid medium in this manner, the problem of air pollution is eliminated. In particular, the powdered lime is mixed with the fluid medium in the closed conduit 28, thereby eliminating the generation of dust during the mixing operation.

Once all of the powdered lime has been mixed with the fluid medium, valves 34, 38 and 44 are closed while valves 52, 56 and 58 are open. Pump 20 is maintained in an active condition thereby causing the fluid medium to be drawn out of storage tank 12 and circulated back to the tank by means of mixing lines 46 and 48. This circulatory action, in conjunction with the spray discharge through openings 50, causes the mixture of powdered lime and fluid medium which is contained within storage tank 12 to be agitated.

The mixture of powdered lime and fluid medium which is contained within storage tank 12 is pumped out of the storage tank by placing valves 44, 52, 54, 56 and 58 in a closed position and placing valves 24, 34 and 38 in an open condition. A hose from a delivery vehicle is then attached to coupling 40 of intake line 36. Thereafter, pump 20 is activated causing the mixture of powdered lime and fluid medium to be drawn out of storage tank 12. This mixture is then pumped to the delivery vehicle through inductor unit 32, conduit 36, and the hose leading to the vehicle. Once the entire mixture of powdered lime and fluid medium has been pumped out of storage tank 12, the hose is disconnected from the delivery vehicle. Pump 20, however, is maintained in an active condition to pump the mixture of powdered lime and fluid medium which remains in output line 18, fitting 26 and branch line 28 through the inductor unit 32. Passage of this material through the inductor unit 32 causes a vacuum to be created within the outer housing of the inductor unit. This vacuum draws the mixture of powdered lime and fluid medium remaining in lime intake line 36 and the hose which was connected to the delivery vehicle to be drawn back into the inductor unit thereby eliminating the chance of spillage.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and and not in a limiting sense.

Having thus described my invention, I claim:

1. A method of producing fluidized lime comprising the steps of
providing a tank and first and second closed fluid paths each leading from one portion of the tank to another portion thereof;
inserting a fluid medium into the tank;
opening said first path and closing said second path;
pumping the fluid medium through said first path in a manner to effect thorough mixing thereof;
closing said first path and opening said second path;
connecting a lime delivery line with a source of powdered lime and with said second path at a preselected location thereon;
thereafter pumping the fluid medium through said second path in a manner to induce flow of powdered lime through said delivery line to said second path, thereby mixing the powdered lime with the fluid medium to produce fluidized lime which is discharged from said second path into the tank;
opening said first path and closing said second path;
thereafter pumping the fluidized lime through said first path to effect thorough mixing thereof;
closing said first path;
closing said second path downstream from said preselected location and opening said second path upstream of said preselected location;
disconnecting said lime delivery line from said second path;
connecting a fluid line with a delivery vehicle and with said second path at said preselected location; and
thereafter pumping the fluidized lime through said second path to said preselected location and from said preselected location through the fluid line to the delivery vehicle.

2. A method as set forth in claim 1, including the step of discharging the fluid medium into the tank from said first path at a plurality of vertically spaced locations.

3. A method as set forth in claim 1, including the step of providing a low pressure region in said second path at said preselected location to induce flow of powdered lime into said second path by suction action.

4. Apparatus for mixing powdered lime with a fluid medium to produce fluidized lime and for delivering the fluidized lime to a delivery vehicle having a fluid line leading thereto, said apparatus comprising:
a source of powdered lime having a delivery line leading therefrom;
a storage tank for holding the fluid medium and fluidized lime;
an outlet conduit having one end communicating with said tank and an opposite end;
a pump in said outlet conduit operable to pump fluid therethrough;
a return conduit communicating at one end with said opposite end of the outlet conduit and at the other end with said tank;
valve means in said return conduit for opening and closing same, said outlet and return conduits providing a closed fluid path for circulating fluid from the tank when said pump is operating and said valve means is open;
a mixing conduit arranged in parallel with said return conduit, said mixing conduit communicating at one end with said opposite end of the outlet conduit and at the other end with said tank;
an inductor unit in said mixing conduit having an enclosed housing and a nozzle in the housing effecting a low pressure region therein in response to fluid flow through the mixing conduit;
first and second valves in said mixing conduit located upstream and downstream from the inductor unit respectively;
a port in said housing of the inductor unit through which powdered lime can be added to the mixing conduit and through which fluidized lime can be withdrawn from the mixing conduit; and
a coupling communicating with said port and detachably connected with said delivery line to effect induced flow of the powdered lime through said delivery line and port for mixing with the fluid passing through said mixing line when said pump is operating and said first and second valves are open, said coupling also being detachably connected with said fluid line to effect flow of the fluidized lime through said port and fluid line to the delivery vehicle when said pump is operating and said first valve is open and said second valve is closed,
whereby powdered lime can be added to the fluid medium in said inductor unit and the mixture can be circulated through said closed fluid path for mixing of the powdered lime and fluid medium to produce fluidized lime which can then be delivered to the delivery vehicle.

5. Apparatus as set forth in claim 4, including valve means between said port and coupling for controlling the flow therebetween.

6. Apparatus as set forth in claim 4, including:
a pair of spray pipes extending vertically in said tank at spaced apart locations therein, said pipes being arranged in parallel with one another and each communicating with said other end of the return conduit to receive fluid therefrom; and
a plurality of vertically spaced discharge openings in each spray pipe for directing fluid into the tank in a spray pattern to effect thorough mixing thereof.

* * * * *